United States Patent
Avikainen et al.

(10) Patent No.: US 7,540,685 B2
(45) Date of Patent: Jun. 2, 2009

(54) MOVABLE OPERATOR STATION FOR A MACHINE

(75) Inventors: Garret R. Avikainen, Maple Grove, MN (US); Larold G. Peterson, Bethel, MN (US); Gregory R. Loftness, Blaine, MN (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 448 days.

(21) Appl. No.: 11/399,173

(22) Filed: Apr. 6, 2006

(65) Prior Publication Data
US 2006/0225935 A1    Oct. 12, 2006

Related U.S. Application Data

(60) Provisional application No. 60/670,066, filed on Apr. 11, 2005.

(51) Int. Cl.
*B62D 33/06* (2006.01)
*E01C 19/23* (2006.01)

(52) U.S. Cl. ............... 404/83; 404/122; 180/89.13; 180/327

(58) Field of Classification Search ............ 404/83, 404/122; 296/190.04; 180/89.13, 327; 172/776
See application file for complete search history.

(56) References Cited

U.S. PATENT DOCUMENTS

| | | | | | |
|---|---|---|---|---|---|
| 3,182,605 | A | * | 5/1965 | Brasher | 105/342 |
| 3,595,409 | A | * | 7/1971 | Bowman-Shaw | 414/544 |
| 4,427,090 | A | * | 1/1984 | Fredriksen et al. | 180/327 |
| 5,064,022 | A | * | 11/1991 | Graham | 182/85 |
| 5,618,146 | A | | 4/1997 | Cooper | |
| 5,727,921 | A | | 3/1998 | Brown | |
| 7,004,275 | B1 | * | 2/2006 | Junga et al. | 180/89.13 |
| 7,204,546 | B2 | * | 4/2007 | Antonetti | 296/190.04 |

OTHER PUBLICATIONS

Wirtgen Group; WR 2500 S The New Generation Of Recyclers; pp. 4-7; Publication prior to Aug. 2002.
Wirtgen Group; WR 2500 Recycler And Its Jobs, Worldwide Application Highlights; pp. 1-40; Publication prior to Aug. 2002.

* cited by examiner

*Primary Examiner*—Raymond W Addie
(74) *Attorney, Agent, or Firm*—Liell & McNeil

(57) ABSTRACT

A machine having a body defining a body width and a ground engaging apparatus greater than one half of the body width and defining first and second working lines of the machine oriented perpendicular to and bounding the working width. An operator station is mounted on the body and movable across the body width between a first work monitoring position associated with the first working line and a second work monitoring position associated with the second working line. A compound linear actuator is provided to move the operator station between the first and second positions.

20 Claims, 4 Drawing Sheets

MOVABLE OPERATOR STATION FOR A MACHINE

This application claims the benefit of the prior provisional patent application Ser. No. 60/670,066, Filed Apr. 11, 2005.

TECHNICAL FIELD

The present disclosure relates generally to movable operator stations for work machines, and relates more particularly to a work machine and operator station therefor that is movable across a width of the work machine between left and right work monitoring positions.

BACKGROUND

Asphalt-surfaced roadways are widely used for vehicular travel. Depending upon the extent and type of usage, asphalt density, age, base conditions, and environmental variables such as temperature and moisture the asphalt surface can become misshapen, non-planar, unable to support wheel loads or otherwise unsuitable for vehicular traffic. In order to rehabilitate roadways, parking lots or other surfaces, a variety of machines are often used in the paving industry for surface treating, for removing, mixing, recycling, laying and compacting of asphalt, soil and other road materials.

Various features such as curbs, lampposts, potholes, manholes, curves in the work surface, etc. typically require the operator to have a good line of sight to the material surface being worked. In some cases, operators are apt to steer widely around obstructions or other features to ensure the work machine will not strike them. While this approach can prevent damage to the equipment, operating efficiency and work quality may be reduced. Regions of unprocessed work material may remain in the buffer zone provided by the operator's unduly wide steering of the work machine. This problem can be particularly acute in the conventional situation where the cab is mounted on one side of the machine and the operator thus has a better view on that side of the machine than the other side. He or she will typically feel more comfortable passing close to an obstruction when the machine side with the better view is adjacent the obstruction. Traditionally, the operator can improve visibility by standing up out of the seat, and peering over the side of the machine as much as possible to view the ground. This technique plainly has various drawbacks, as the operator must continue to control machine operation, and may tire of twisting and turning in the seat. Some systems use mirrors to provide the operator indirectly with improved visibility but have met with limited success due to dust collecting on mirrors. There also tend to be issues relating to low-hanging trees, forcing the operators to move so they avoid being struck by branches.

In view of the above constraints, overall work planning may have to account for passing a given obstruction, curve, etc. on only one side of the machine. Requiring potholes and curves to be passed on only the left side of the work machine, for example, can require the operator to turn, back-up and reverse the work machine more than what is considered ideal. Prior to or during a job, the machine path may have to be routed to account for various obstacles and work surface features in such a way that an excessive amount of time is required to complete the job.

In an attempt to improve overall operating efficiency, certain work machines have been developed which utilize a movable operator cab to improve the operator's view of the work machine and its relative position on the work surface. Machines manufactured by Wirtgen Gmbh have an operator cabin that is movable from a center position of the machine to a side position. Such a design certainly can improve operator visibility on one side of the machine, however, the view on the other side is no better than with a stationary cabin.

In different technical areas, machines are known having greater flexibility in operator cab position. U.S. Pat. No. 5,618,146 to Cooper is directed to a hay roll transporter that includes a cab that can slide side to side to allow hay rolls to be loaded alternately in different rows on a bed of the machine. The Cooper machine provides a front ramp having forks to pick up and load rolls of hay into side by side rows, the front ramp being movable to align with the row to which a hay roll is to be added. An operator can apparently drive the forks into a hay roll, then move the cab to the side to allow the hay roll to be lifted and rolled into place. In Cooper, the working width of the machine is defined by the forks, and is relatively narrow, less than about one half the overall width of the machine. Working lines defined by the lateral edges of the forks may be monitored by the driver when the forks engage a hay roll, but the operator cab is then moved to the side to allow the forks to flip the hay roll onto the bed of the machine. While Cooper appears to provide a configuration suitable for its intended purpose, it does not contemplate operator monitoring of the relative position of working lines at the lateral sides of the machine, nor would such monitoring be desirable or even realistically possible given the design and intended use of the machine.

The present disclosure is directed to one or more of the problems or shortcomings set forth above.

SUMMARY OF THE INVENTION

In one aspect, the present disclosure provides a work machine. The work machine includes a body defining a body width, and a ground engaging apparatus coupled with the body and defining a working width that is greater than one half of the body width. The ground engaging apparatus defines first and second working lines of the work machine oriented perpendicular to and bounding the working width. An operator station is mounted on the body and is movable across the body width between a first work monitoring position associated with the first working line, and a second work monitoring position associated with the second working line.

In another aspect, the present disclosure provides a method of operating a work machine including the step of operating the work machine with an operator station positioned at a first work monitoring position associated with a first working line of the work machine bounding a working width defined by a ground engaging apparatus of the work machine and being greater than one half a body width thereof. The method further includes the step of operating the work machine with the operator station positioned at a second work monitoring position associated with a second working line of the work machine opposite the first working line and also bounding the working width.

In still another aspect, the present disclosure provides a movable operator station for a work machine. The operator station includes an operator platform configured for guided movement between a first position and a second position at opposite sides, respectively, of the work machine. The operator station further includes at least one guide rail adapted to guide movement of the operator platform, the at least one guide rail being connectable to one of the operator platform and a body of the work machine. The operator station still further includes a compound linear actuator coupled with the operator platform and movable between an extended position at which the operator platform is at the first position, and a retracted position at which the operator platform is at the second position.

DETAILED DESCRIPTION

Figure 1:
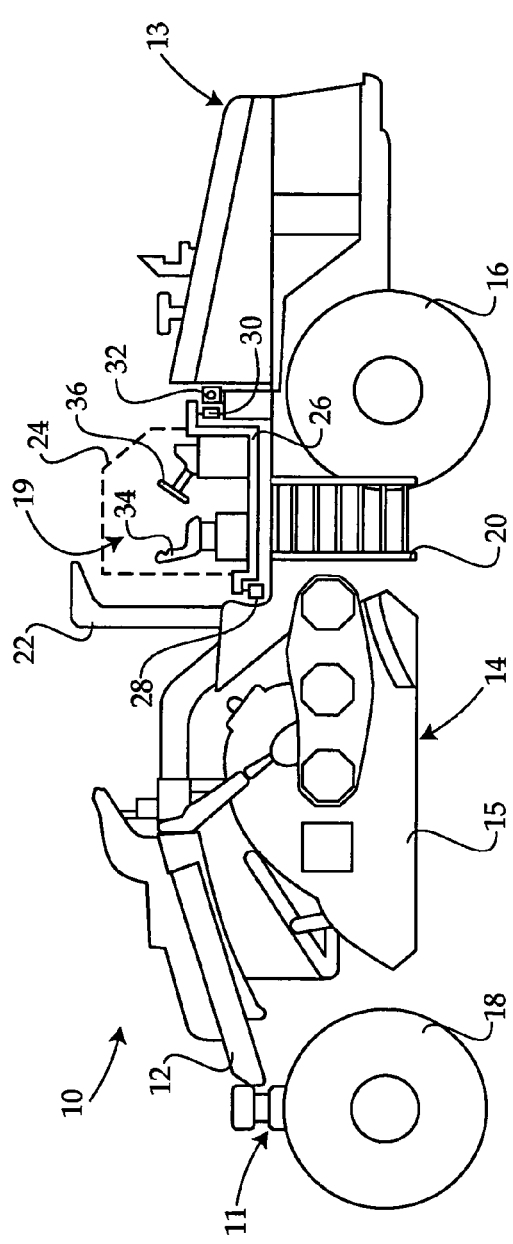
FIG. 1 is a side diagrammatic view of a work machine according to the present disclosure.

Referring to FIG. 1, there is shown a work machine 10 according to the present disclosure. Work machine 10 includes a body 12 having a back end 11 and a front end 13 and front 16 and rear 18 sets of tires. A work material processing apparatus 14 is coupled with body 12 and configured to process a work material, as described herein. A movable operator station 19 is coupled with body 12 and movable across a width of body 12, between lateral sides of work machine 10, to allow an operator to monitor work progression during travel of the work machine 10. Work machine 10 may further include a canopy 22 or similar structure defining a canopy space, operator station 19 typically being at least partially within the canopy space at all times, and in some embodiments being wholly within the canopy space. An access ladder 20 and associated mounting assembly may also be provided for accessing operator station 19, and may be configured to move outwardly via sliding or pivoting, for example, to accommodate operator station 19 at the extreme outer limits of its movement. In one practical implementation strategy, access ladders will be provided on both sides of work machine 10, although only one is illustrated in FIG. 1.

Work machine 10 is shown in the context of a rotary mixer machine, such as the type used to recycle and process asphalt wherein work material processing apparatus 14 comprises a toothed rotor. It should be appreciated, however, that a wide variety of work machines are contemplated within the context of the present disclosure, and any machine wherein a movable operator station is desirable may benefit from the teachings set forth herein. For example, a scraper operable to remove a layer of material from a work surface, or even a compactor, motor grader or track type tractor might be equipped with a movable operator station as described herein, and hence fall within the scope of the present disclosure.

Figure 2:
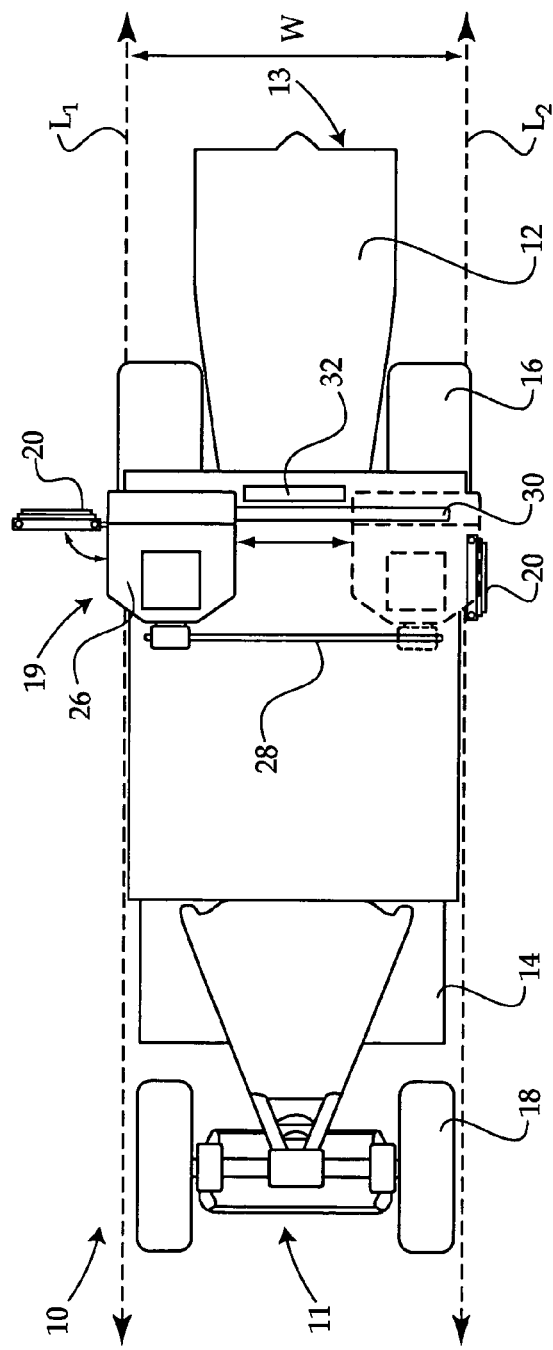
FIG. 2 is a top diagrammatic view of a work machine similar to the work machine of FIG. 1.

Movable operator station 19 may include a movable operator platform 26 upon which an operator seat 34 and steering wheel 36 or similar control apparatus are mounted. An operator cabin 24 may, but need not be, a part of operator station 19. Referring also to FIG. 2, operator station 19 is shown positioned approximately at a leftmost limit of its range of motion, a first work monitoring position. Operator station 19 is shown in phantom in FIG. 2 at a position corresponding approximately to a rightmost limit of its range of motion, a second work monitoring position. At the first and second work monitoring positions, operator station 19 may be positioned above first and second working lines $L_1$ and $L_2$, described herein, and may also be positioned to overhang lateral sides of work machine 10. Depending upon the design of the work machine and its intended application, in other embodiments the first and second monitoring positions might not extend above the working lines, nor overhang sides of the machine.

It will also be noted that left and right access ladders 20 are shown in FIG. 2, with the left access ladder shown displaced from a position it would occupy against body 12 but for the positioning of operator station 19. In other words, access ladders 20 may be biased toward positions adjacent body 12, but configured to move via sliding or pivoting away from body 12 when urged outwardly by operator station 19.

In the embodiment shown in FIGS. 1 and 2, operator station 19 may be mounted on a back 28 and front 30 guide rail. An actuator 32, further described herein, may be coupled with operator station 19 and operable to move the same between its leftmost position and its rightmost position, or any of an infinite number of positions therebetween. Work machine 10 may include a working width W, bounded by the left and right working lines $L_1$ and $L_2$, which will typically be greater than about one half of a width of body 12. In some embodiments, working width W may be substantially equal to a width of body 12.

Working width W may be defined by a ground engaging apparatus of work machine 10. The subject ground engaging apparatus which defines the working width may be a work material processing device such as apparatus 14, or it might instead be the front 16 or back 18 sets of tires, or some other apparatus such as a towed or pushed ground engaging apparatus or surfacing tool. In the context of a compactor, the ground engaging apparatus could comprise compactor drums for processing work material via compaction. For a motor grader the ground engaging apparatus might be the grader blade, and for a track type tractor the ground engaging apparatus could be the tracks themselves or a work implement, for example. The ground engaging apparatus, for example apparatus 14, may include at least one ground engaging element, such as a rotary mixer device or the like (not shown) housed within a hood 15.

During operation, it will typically be desirable for the operator to be able to determine the outermost lateral portion of work machine 10 which is engaging the ground. The outermost later portion engaging the ground will thus typically define the working lines. In some instances, however, some other part of work machine 10 that extends laterally but does not engage the ground may be of interest and, hence, define the working lines. Regardless, the working lines will typically be defined by the outermost lateral portion of work machine 10, the relative location of which it is desirable to monitor to avoid obstacles or follow a desired machine path. To this end, each of the first and second work monitoring positions may comprise location monitoring positions, such that an operator can monitor the location of ground engaging elements or another feature of work machine 10 such as hood 15 that needs to clear obstructions, or follow a designated boundary such as a painted line on the work surface. In certain designs, the width of apparatus 14 may extend outwardly of tire sets 16 and 18. In other designs, apparatus 14 may have a width less than the width of work machine 10 between tire sets 16 and 18. Thus, those skilled in the art will appreciate that different parts of work machine 10 may be the parts whose location is to be monitored in different situations. For example, an operator may need to avoid running the machine's tires into a large pothole in an asphalt surface. Alternatively, the operator may need to avoid striking a lamppost with hood 15, or engaging a rotary cutting apparatus with a concrete curb.

Regardless of what features of work machine 10 are chosen as defining the working lines, operator station 19 will be movable between a first work monitoring position associated with first working line $L_1$ and a second work monitoring position associated with second working line $L_2$. As used herein, the term "associated with" should be understood as meaning that the work monitoring position is such that an operator will be able to visually monitor the position of the outermost lateral part of the work machine whose location is of present importance. This will allow the operator to steer work machine 10 around obstructions, stop the work machine if an obstruction is inadvertently contacted or approached, or simply guide the work machine along a predetermined path such as a painted line on the work surface or the edge of a paved road.

Figure 3:
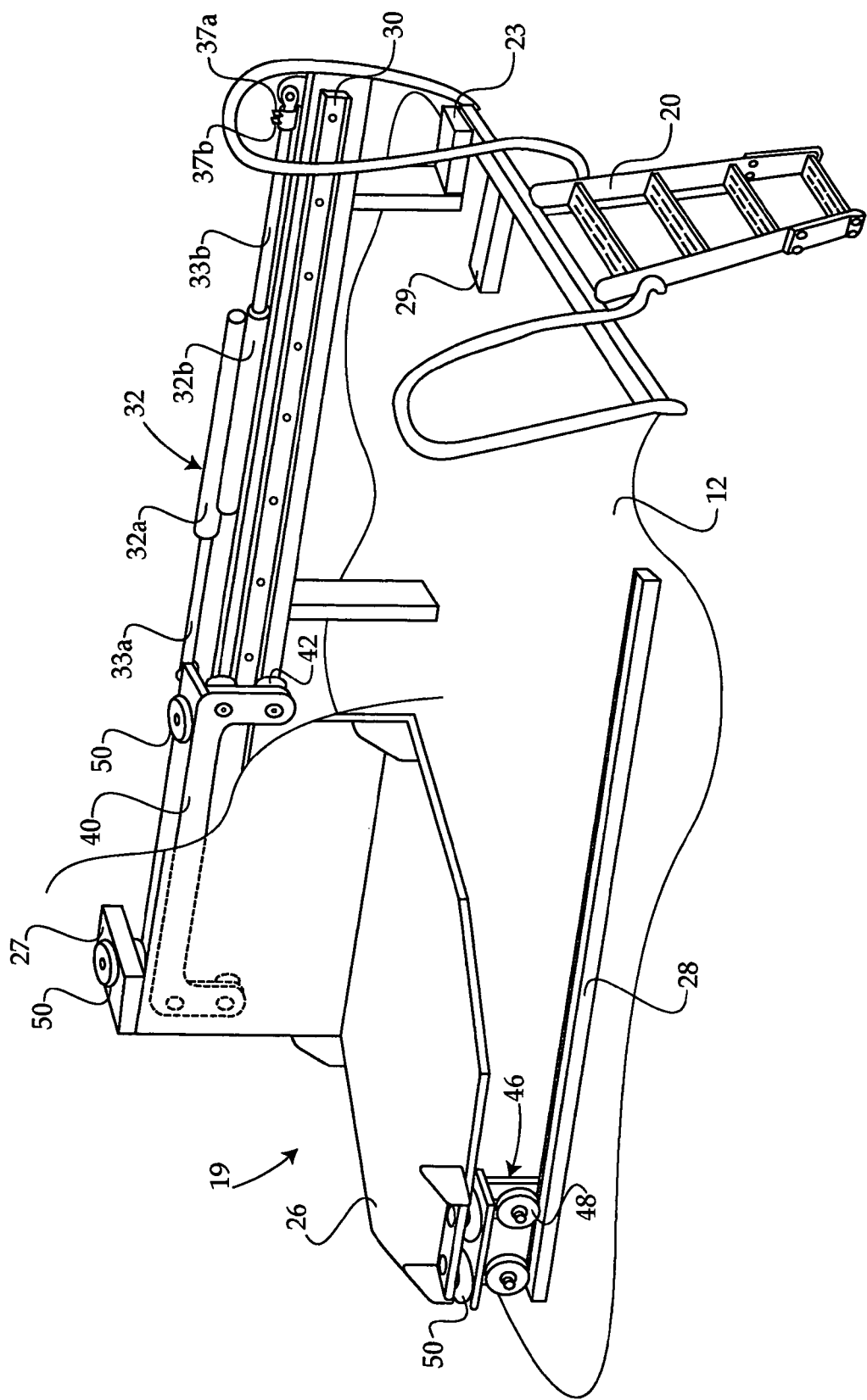
FIG. 3 is a diagrammatic perspective view, partially in cut-away, illustrating a movable operator station according to the present disclosure.

Turning to FIG. 3, there is shown diagrammatically, partially in cut-away, operator station 19 mounted on body 12 of work machine 10. As illustrated, operator station 19 may be mounted upon a front roller assembly 40 that includes sets of rollers 42 positioned above and below guide rail 30, and a back roller assembly 46 that includes rollers 48 positioned on top of guide rail 28. Guide rails 28 and 30, in conjunction with roller assemblies 40 and 46, will allow operator station 19 to smoothly roll between its left and right work monitoring positions, and may be mounted to body 12. It should be appreciated, however, that rather than rollers, operator station 19 might simply slide back and forth on guide rails 28 and 30. Further, instead of guide rails, station 19 might be mounted on a pivoting mechanism such that it pivots between its extreme positions. The entire operator station could also be mounted on a hanging apparatus capable of moving the same between left and right work monitoring positions. Also, instead of guide rails on body 12, the guide rails could be mounted to operator station 19, and rollers or skids coupled with body 12.

Operator station 19 may further be iso-mounted to body 12, for example via elastomeric pads 50. To this end, one end of platform 26, adjacent roller assembly 40, may be mounted on isolation pads 50, for example, left and right sets of pads configured to sandwich left and right extensions 27 of platform 26 between the individual pads 50 of each set. A similar iso-mounting configuration, also utilizing elastomeric pads 50, may be used for mounting the other end of platform 26, adjacent roller assembly 46. Isolation mounting of operator station 19 tends to reduce shocks and vibrations transmitted to the operator, and improve overall machine performance and operator satisfaction.

Figure 4:
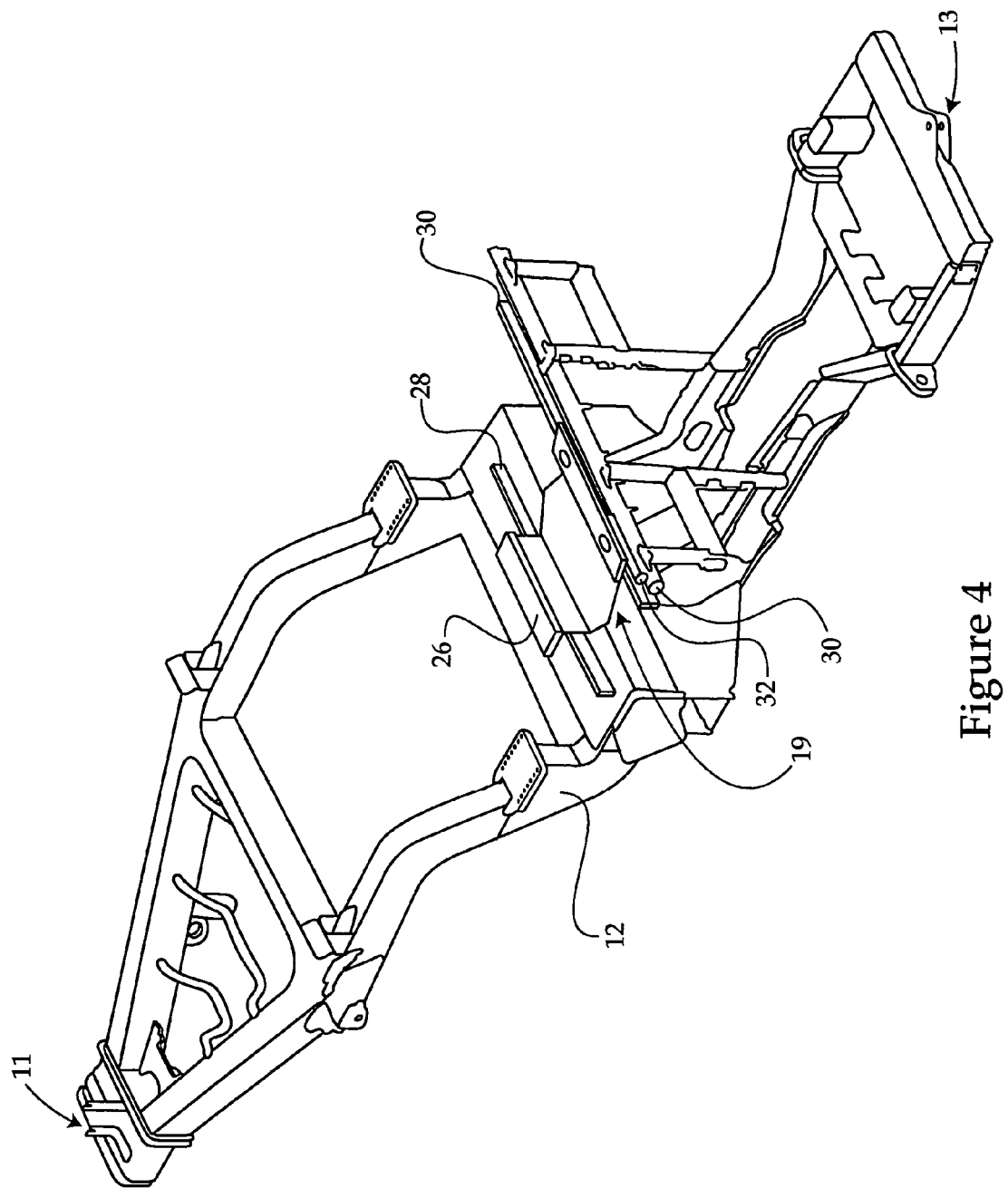
FIG. 4 is a perspective view illustrating a movable operator station mounted to a portion of a work machine body according to the present disclosure.

Also shown in FIG. 3 is access ladder 20. Access ladder 20 may be coupled with body 12 via a connector 21, and may be biased toward a position against body 12 with an actuator 29, for example, a spring biased actuator 29. Although only a single access ladder is shown in FIG. 3, in most embodiments, access ladders will be provided on each side of work machine 10 so that an operator may enter or exit operator station 19 from either side. At many construction sites, it may be desirable to park work machines relatively close together, thus work machine 10 provides an advantage in that an operator may enter or exit the machine from either side, after parking relatively close alongside an adjacent machine. When operator station 19 is moved to one of its work monitoring positions, typically an extreme left or right position on work machine 10, it may push access ladder 20 outwardly against the biasing force of actuator 29. When operator station 19 is away from its work monitoring position, back toward a center position, actuator 29 will return ladder 20 to its biased position, against body 12. Repositioning the access ladders against body 12 when not displaced by operator station 19 facilitates configuring work machine 10 to have a suitable shipping width. Certain jurisdictions have limitations on shipping widths such that fixing ladders relatively farther from body 12 to accommodate operator station 19 at its full range of motion is impracticable or economically undesirable. Referring briefly to FIG. 4, there is shown operator station 19 approximately as it would appear mounted at a position between back 11 and front 13 ends of work machine 10. It should be appreciated, however, that the illustrated configuration of body 12 in FIG. 4 is suitable for a rotary mixer machine and is thus exemplary only, it will be readily apparent that for different work machine types, body 12 may appear markedly different.

Returning to FIG. 3, actuator 32 may be operable to move operator station 19 all the way between its first and second work monitoring positions, and may include a linear actuator such as a compound hydraulic actuator. Hydraulic lock valves may be used to lock operator station 19 at a desired position anywhere within its range of motion. Actuator 32 may further be configured to move operator station 19 from one of the work monitoring positions to the other of the work monitoring positions solely via extension, and thus configured to return operator station 19 to the original position solely via retraction. This design strategy provides for smooth, reliable movement across the full body width of work machine 10. As used herein, the term "compound hydraulic actuator" should be understood to refer to hydraulic actuators having dual actuation members.

In other words, a first actuation member can extend or retract to move operator station 19 over a first portion of its range of motion, whereas a second actuation member can move operator station 19 over the second portion of its range of motion. Such actuators are commonly referred to in the art as "piggybacked" hydraulic actuators. The use of a single, albeit compound, actuator further allows movement of operator station 19 without the need for synchronizing separate actuators, as might be required if separate front and back actuators were used. Hydraulic actuators have further been found to be well suited to the often dusty environments in which work machines, particularly rotary mixers and the like, must operate, although alternatives such as rotary actuators or pneumatic actuators might be used without departing from the scope of the present disclosure. In still further embodiments, operator station 19 may be configured to be manually moved on rollers across the width of work machine 10. The use in particular of a compound actuator still further provides for an actuation system having a width that is less than or equal to the width of body 12. In certain jurisdictions, relatively strict width limitations make limiting the total width of work machines desirable. The rotary mixer described herein may have a width that is about three meters, and hence actuator 32 may itself have a working width no greater than about three meters. Relatively larger hydraulic actuators might be used, however, they are often characterized by excessive lengths, and may be impractical in many instances. Thus, the present compound actuator 32 provides for a relatively long total stroke distance, about twice the length of the coupled cylinders, without the size and expense of a larger actuator.

Figure 5:
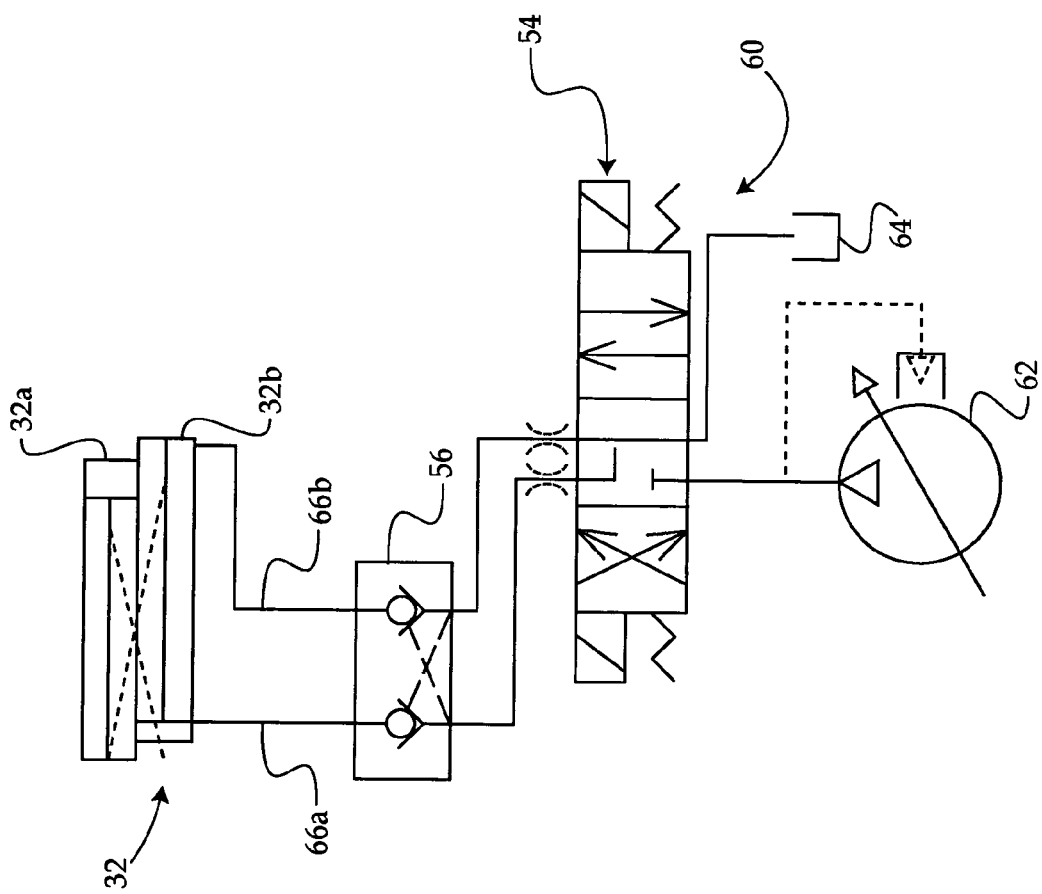
FIG. 5 is a schematic view of a hydraulic system suitable for use in moving an operator station according to the present disclosure.

Actuator 32 may thus include first and second hydraulic cylinders 32a and 32b, wherein a first rod 33a is coupled with operator station 19 and a second rod 33b is coupled with body 12. The left/right orientation and connections with body 12 and operator station 19 may be reversed from that illustrated in FIG. 3, in other embodiments. A first port 37a may be associated with first cylinder 32a whereas a second port 37b may be associated with second cylinder 32b, and may each be fluidly connected with a hydraulic fluid supply. The ports may connect via an internal passage in rod 33b, or by some other configuration. Referring to FIG. 5, there is shown a hydraulic system 60 suitable for use with actuator 32. System 60 may include a hydraulic pump 62 such as a pressure compensated pump, a tank 64, and first and second hydraulic lines 66a and 66b associated with cylinders 32a and 32b, respectively. A first valve assembly 54 and a second valve assembly 56 may be disposed fluidly between pump 62 and actuator 32. Both of valve assemblies 54 and 56 are well known in the art and are suited for controlling actuator 32 in a known manner, for example, allowing concerted or separate actuation via cylinders 32a and 32b.

INDUSTRIAL APPLICABILITY

During operation, work machine 10 will typically be guided along a work path such that it may process work material with apparatus 14. A particular work path may extend along or across, for example, an asphalt road or parking lot. The operator will typically guide work machine 10 by orienting one of working lines $L_1$ and $L_2$ relative to a reference line or reference point. Thus, with operator station 19 positioned above one of working lines $L_1$ and $L_2$, the operator can visually monitor the position of the ground engaging elements of work machine 10, whether the ground engaging elements of interest are the tires or work material processing apparatus. The process of guiding a work machine such as work machine 10 along a reference line is generally referred to in the art as a "match-a-line" operation.

When, during operation, an obstruction such as a curb is encountered, the operator will be able to position operator station 19 such that he or she has a clear line of sight that will allow work machine 10 to be guided around the obstruction. Visual monitoring of the position of ground engaging apparatus 14 or tire sets 16 and 18 and the obstruction or other feature will allow it to be avoided, or followed in the case of a painted line or edge of the work surface, without creating an unduly large buffer zone of unprocessed material. If, for example, work machine approaches a curb, pothole, etc. on the side of work machine 10 opposite to where operator station 19 is positioned, the operator can slow or stop work machine 10, and move operator station 19 to a position at which the obstruction can be readily seen relative to the working line of work machine 10 that is on the same side as the obstruction. It is contemplated that movement of operator station 19 may be effected via controls such as a toggle switch (not shown) positioned on operator platform 26, or within cab 24 where such is used.

The present disclosure provides significant advantages over known designs in that operator station 19 may be positioned where the operator can visually monitor the relative location of the tires, work material processing apparatus, and any other part of the machine of interest that is located on a lateral side thereof. By visually monitoring the location of a part of work machine 10 relative to a reference point, whether a painted line, pothole, edge of the pavement, curve, curb or some other reference point, operating efficiency and quality are improved over known design. This capability does not exist in known designs wherein the operator's line of sight is blocked by parts of the machine due to a stationary or limited movement operator station, or where the operator attempts to operate the machine by standing up or leaning out of the seat. Rather than requiring the operator to stand up, or change machine direction, the operator can perform the required viewing of ground engaging apparatus 14 or tire sets 16 or 18, etc., without ever leaving his or her seat.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. While much of the foregoing description focuses on positioning a movable platform or cabin such that the operator can visually monitor working lines of the work machine, movement of the operator's seat alone might accomplish a similar purpose and therefore be fairly considered to fall within the scope of the present disclosure. Further, while the present disclosure contemplates an actuator mounted at a front of the operator station to move the same, in other embodiments the actuator(s) might be mounted at the back of the operator station, the sides, etc. It should still further be appreciated that embodiments are contemplated wherein the "working width" of the machine is substantially greater than the work machine body width, in contrast to the embodiments illustrated herein. For example, in a paver and screed machine assembly, a paver may be configured to tow a screed, defining the working lines and hence, working width, which is approximately twice the width of the paver. Other aspects, features and advantages will be apparent upon an examination of the attached drawings and appended claims.

What is claimed is:

1. A machine comprising:
a body defining a body width;
a ground engaging apparatus coupled with said body and defining a working width that is greater than one half of said body width, said ground engaging apparatus defining first and second working lines of said machine oriented perpendicular to and bounding said working width;
an operator station mounted on said body, said operator station being movable a travel distance across said body width from a first work monitoring position associated with said first working line to a second work monitoring position associated with said second working line; and
an actuation system coupled between the movable operator station and the body and including a first actuation member defining a first reciprocation axis and being movable in a first direction from a first retracted position to a first extended position to move the operator station a first part of the travel distance, the actuation system further including a second actuation member defining a second reciprocation axis parallel the first reciprocation axis and being movable in a second direction opposed to the first direction from a second retracted position to a second extended position to move the operator station a second part of the travel distance.

2. The machine of claim 1 wherein said ground engaging apparatus defines a working width substantially the same as said body width.

3. The machine of claim 1 wherein at said first work monitoring position said operator station is positioned above said first working line, and at said second work monitoring position said operator station is positioned above said second working line.

4. The machine of claim 1 wherein said actuation system further comprises a linear actuator which includes said first actuation member and said second actuation member and is configured to move said operator station via extension of said first actuation member and said second actuation member from one of said first and second work monitoring positions to the other of said first and second work monitoring positions, and wherein said linear actuator is further configured to return said operator station via retraction to the one of said first and second work monitoring positions.

5. The machine of claim 4 wherein said actuator comprises a compound linear hydraulic actuator having a first rod end coupled to said body and a second rod end coupled to said operator station, and wherein said first reciprocation axis is non-colinear with said second reciprocation axis.

6. The machine of claim 3 wherein said first work monitoring position is a location monitoring position for said first working line relative to a left reference point, and said second work monitoring position is a location monitoring position for said second working line relative to a right reference point.

7. The machine of claim 3 wherein said ground engaging apparatus comprises at least one rotatable material working device.

8. The machine of claim 7 wherein said ground engaging apparatus comprises a rotary mixer apparatus.

9. The machine of claim 7 wherein said operator station further comprises a platform and front and back guide rails each mounted to one of said platform and said body.

10. The machine of claim 9 wherein said front and back guide rails are mounted to said body, said operator station further comprising a front roller assembly and a back roller assembly associated with said front and back guide rails, respectively.

11. A machine comprising:
a body defining a body width;
a ground engaging apparatus coupled with said body and defining a working width that is greater than one half of said body width, said ground engaging apparatus defining first and second working lines of said machine oriented perpendicular to and bounding said working width; and
an operator station mounted on said body, said operator station being movable across said body width via a linear range of motion from a first work monitoring position associated with said first working line to a second work monitoring position associated with said second working line;
wherein at said first work monitoring position a portion of said operator station is positioned above and laterally outward of said first working line, and at said second work monitoring position a portion of said operator station is positioned above and laterally outward of said second working line; and
wherein each of said first and second positions is a position at which said operator station overhangs a lateral side of said body.

12. A work machine comprising:
a body defining a body width;
a ground engaging apparatus coupled with said body and defining a working width that is greater than one half of said body width, said ground engaging apparatus defining first and second working lines of said work machine oriented perpendicular to and bounding said working width; and
an operator station mounted on said body, said operator station being movable across said body width between a first work monitoring position associated with said first working line, and a second work monitoring position associated with said second working line;
wherein at said first work monitoring position said operator station is positioned above said first working line, and at said second work monitoring position said operator station is positioned above said second working line;
wherein said ground engaging apparatus comprises at least one rotatable material working device;
wherein said operator station further comprises a platform and front and back guide rails each mounted to one of said platform and said body; and
the work machine further comprising first and second movable ladder assemblies coupled with said body and biased toward a position against said body, said ladders being disposed at opposite sides of said operator station and configured to move outwardly to accommodate said operator station at its first and second positions, respectively.

13. The work machine of claim 12 wherein the platform of said operator station includes an operator cabin mounted thereon.

14. The work machine of claim 12 further comprising a canopy defining a canopy space, wherein at each of the first and second positions said operator station is at least partially within said canopy space.

15. The work machine of claim 12 wherein said work machine is a rotary mixer machine having a set of front wheels and a set of rear wheels, said ground engaging apparatus including a rotary mixer apparatus coupled to said body between said front and rear wheels, and wherein said operator station being isolation mounted to said body at a position between said front and rear wheels via a plurality of isolation pads.

16. A method of operating a machine comprising the steps of:
operating the machine with an operator station positioned at a first work monitoring position associated with a first working line of the machine bounding a working width defined by a ground engaging apparatus of the machine and being greater than one half a body width thereof;
operating the machine with the operator station positioned at a second work monitoring position associated with a second working line of the machine opposite said first working line and also bounding the working width and
wherein the step of operating the machine with the operator station positioned at the first work monitoring position further includes operating the machine with a portion of the operator station positioned laterally outward of the first working line;
wherein the step of operating the machine with the operator station positioned at the second work monitoring position further includes operating the machine with a portion of the operation station positioned laterally outward of the second working line;
wherein the method further includes the steps of moving the operator station a first part of a travel distance from the first work monitoring position to the second work monitoring position via a first actuation member of an actuation system for the operator station which defines a first reciprocation axis, and moving the operator station a second part of the travel distance via a second actuation member of the actuation system which defines a second reciprocation axis parallel and non-colinear with the first reciprocation axis.

17. The method of claim 16 wherein each of the operating steps comprises a step of monitoring a position of the respective working lines relative to a desired position.

18. The method of claim 17 wherein the step of operating the machine with the operator station positioned at a first work monitoring position includes operating the machine with the operator station positioned at a first work monitoring position at which the operator station overhangs a first lateral side of a body of the machine, and wherein the step of operating the machine with the operator station positioned at a second work monitoring position includes operating the machine with the operator station positioned at a second work monitoring position at which the operator station overhangs a second lateral side of the body of the machine.

19. The method of claim 18 wherein the moving step comprises a step of moving a first rod of a compound linear actuator attached to the operator station, and a step of moving a second rod of the compound linear actuator attached to the body of the machine.

20. A movable operator station for a machine comprising:
an operator platform configured for guided movement between a first position and a second position at opposite sides, respectively, of the machine;
at least one guide rail adapted to guide movement of said operator platform said at least one guide rail being connectable to one of said operator platform and a body of said machine; and
a compound linear actuator coupled with said operator platform and movable between an extended position at which said operator platform is at said first position, and a retracted position at which said operator platform is at said second position, the compound linear actuator including a first actuation member defining a first reciprocation axis and being configured to move the operator platform a first part of a travel distance between the first position and the second position and a second actuation member defining a second reciprocation axis and being configured to move the operator platform a second part of the travel distance, the second reciprocation axis being parallel and non-colinear with the first reciprocation axis.

* * * * *